United States Patent

[11] 3,625,601

[72] Inventors Peter Augusto
 Worcester;
 Charles Herman Swope, Holliston, both of Mass.
[21] Appl. No. 7,632
[22] Filed Feb. 2, 1970
[45] Patented Dec. 7, 1971
[73] Assignee American Optical Corporation
 Southbridge, Mass.

[54] METHOD AND APPARATUS FOR MEASURING RETINAL DEPRESSIONS AND ELEVATIONS
 18 Claims, 4 Drawing Figs.
[52] U.S. Cl. ................................................. 351/6,
 351/39, 356/120, 356/171
[51] Int. Cl. ....................................... A61b 3/10,
 G01b 11/30
[50] Field of Search ........................................ 351/6, 39;
 356/120, 124, 171, 109, 214

[56] References Cited
 UNITED STATES PATENTS
 3,289,298 12/1966 Standridge ................... 356/120 X
 3,347,130 10/1967 Seibel ............................ 356/120

FOREIGN PATENTS
 168,466 1934 Switzerland ................. 356/214
 OTHER REFERENCES
 Robert E. Cox, " Gleanings For ATM' s," Sky and Telescope, April 1958, pp. 309, 310 & 317

Primary Examiner—David Schonberg
Assistant Examiner—Paul A. Sacher
Attorneys—William C. Nealon, Noble S. Williams, Robert J. Bird and Bernard L. Sweeney ABSTRACT: Retinal depression and elevation measurements are obtained with an apparatus which includes a relay lens which is placed in front of a subject's eye to form an aerial image of the area of the retina of the eye to be measured. A marker having a needle point is placed on the opposite side of the lens from the eye. The aerial image is then viewed through a stereoscopic indirect ophthalmoscope, focusing first on a reference plane, the marker needle is moved into focus in the aerial image and then the ophthalmoscope refocuses onto a secondary plane in the image. By moving the marker needle into focus in the secondary plane, the distance of movement of the marker needle determines the relative depression or elevation of the secondary plane.

PATENTED DEC 7 1971
3,625,601
SHEET 1 OF 2
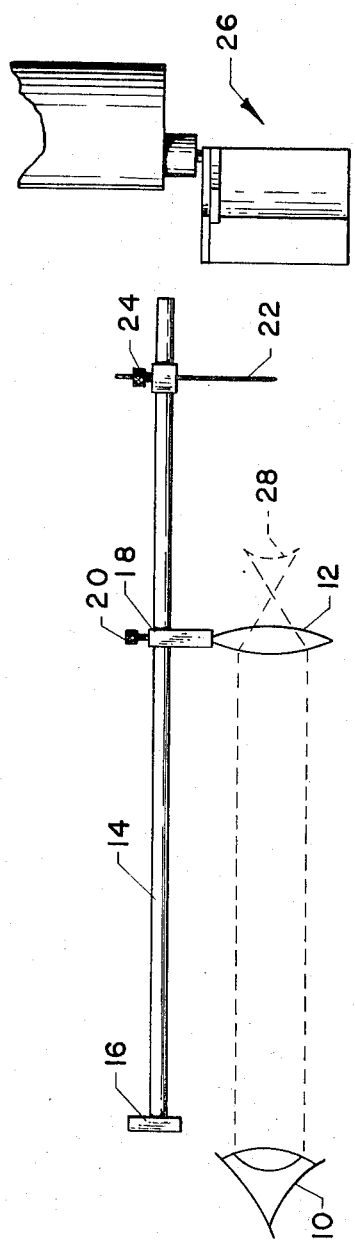
FIG. 1
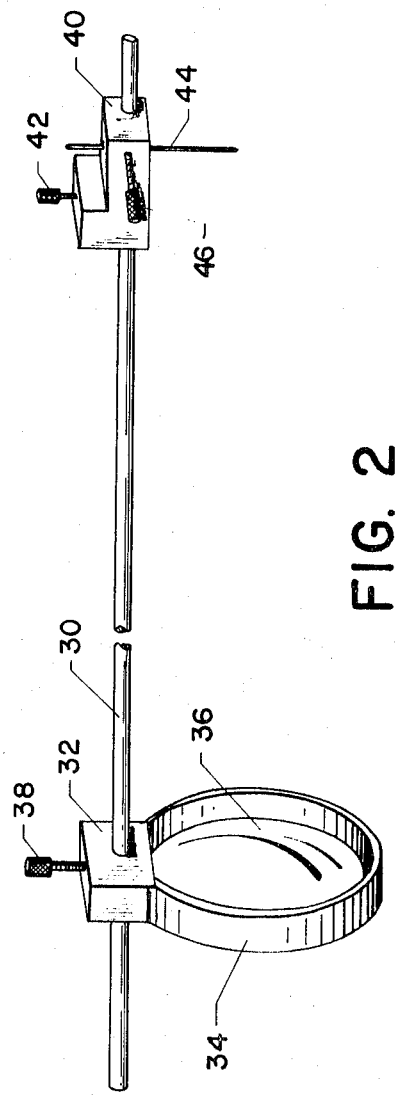
FIG. 2
INVENTOR.
PETER AUGUSTO
CHARLES HERMAS SWOPE
BY
AGENT

METHOD AND APPARATUS FOR MEASURING RETINAL DEPRESSIONS AND ELEVATIONS

BACKGROUND OF THE INVENTION

This invention is related to ophthalmoscopic instruments and is more particularly concerned with instruments for use with standard ophthalmoscopes for measuring retinal depressions and elevations.

The currently used method of determining elevation measurements in a subject's eye consists generally of using direct ophthalmoscopy. For example, the amount of depression or protrusion of the optic disc or its vessels is found by noting the difference in diopters between the strongest plus lens and the weakest minus lens, in an ophthalmoscope, required to blur a small vessel on the retina and a vessel in the disc in the same meridian. A difference of 3 diopters represents about a 1-mm. elevation or depression. Such a method has considerable disadvantages, and these include:

1. Direct ophthalmoscopy must be used which limits the magnification obtainable to about 15 times (15 X).
2. A direct ophthalmoscope is a single-lens viewing device; therefore, only direct monocular viewing is possible, which results in a lack of depth perception by stereoptic clues.
3. The accuracy of the method is limited by the values of the lens powers available on the direct ophthalmoscope, which vary in 0.25 diopter steps for a double lens refracting instrument, to 1.0 diopter steps for a hand-held ophthalmoscope. The resolution on the larger more complete refracting instrument is about one-twelfth mm.
4. Errors are inherent in the prior method, because only discrete intervals of focus can be obtained, either intervals of 0.25 diopters or 1.0 diopters. In addition, the accuracy of the measurement is limited to the depth of focus of the lens in use. Without stereoptic clues, the measurement may fall anywhere within this depth of focus.

SUMMARY OF THE INVENTION

According to the present invention, there is provided method and apparatus for indirect stereoscopic intraocular depth measurement. The apparatus includes the use of a lens system optically aligned with and in front of a subject's eye to form an image of the area to be measured. The image is viewed through an eye viewing instrument, and a marker is optically placed between the lens system and the eye viewing instrument and provides a means for marking the focal position of the instrument on a primary plane of the aerial image. The marker is optically movable throughout the various planes of the image and when the instrument is refocused on a plane of interest, the movement of the marker to that plane provides a measurement of the separation of the planes. In one form of the invention, a relay lens is hand-held in front of the subject's eye and a head mounted ophthalmoscope is used to focus on the produced aerial image of the subject's eye. In another form of the invention, a relay lens may be mounted on a frame which is placed in front of the subject's eye. An ophthalmoscope is mounted on the frame for viewing the produced aerial image of the subject's eye. In either case, the operator initially focuses upon a level of reference in the produced aerial image, for example, the base of the optic disc, and at the same time places the marker in that plane of the aerial image. The operator then focuses the opthalmoscope onto a secondary plane of the aerial image, which may be the surface of the retina, and again superimposes the needle on the image in the new plane. The distance between the reference plane and the secondary plane, as shown by the movement of the marker needle, accurately determines the depression or the protrusion of the surface relative to the reference plane.

Other embodiments of the invention include the use of a diffusing screen as the marker and a means for determining the relative size of a retinal elevation or depression normal to the optical axis.

The method and the apparatus of the present invention provide distinct advantages over the prior art, and these include:

1. Stereoptic viewing may be provided with a hand-held instrument. Stereoptic viewing affords the advantages of depth perception and parallax clues while superimposing the planes of the aerial image, thereby significantly increasing the accuracy of the measurement.
2. A considerable improvement in the accuracy of the measurement is obtained by measuring the movement of the superimposed marker rather than estimating the position of the plane by a blurred image as is done in the prior method.

It is, therefore, included among the objects and advantages of the present invention to provide a method of forming an aerial image of a subject's eye and superimposing a marker at different planes on the projected image and measuring the distance of movement of a superimposed marker to determine accurately the relative positions of depression or elevation points in a subject's retina.

Another object of the invention is to provide means for producing an aerial image of a subject's eye which may be viewed through an ophthalmoscope to indirectly measure the contours of the subject's eye.

Another object of the invention is to provide a relay lens between the subject's eye and an opthalmoscope to produce an aerial image of the subject's eye to emphasize parallax advantages.

A further object of the invention is to provide apparatus for producing an aerial image of a subject's eye whereby the aerial image may be viewed with an ophthalmoscope to produce magnification of the eye, and means including a marker for the measurement of the relative spatial positions of various planes in the aerial image.

A still further object of the invention is to provide apparatus for determining the relative size of a retinal irregularity in a direction normal to the optical axis of the eye lens.

Further objects, advantages, and features of the invention will be apparent in the arrangement and construction of the constituent parts in detail as set forth in the following specification taken together with the accompanying drawing.

DESCRIPTION OF THE DRAWING

In the drawing,

FIG. 1 is a generally schematic view of one form of the invention illustrating the positioning of a relay lens for viewing by an ophthalmoscope, FIG. 2 is a generally perspective view of a relay lens and marker device for producing an aerial image and for measuring the relative distances between planes in the image produced by the relay lens of the device.

DETAILED DESCRIPTION OF THE PREFERRED EMBODIMENTS

Figure 3:
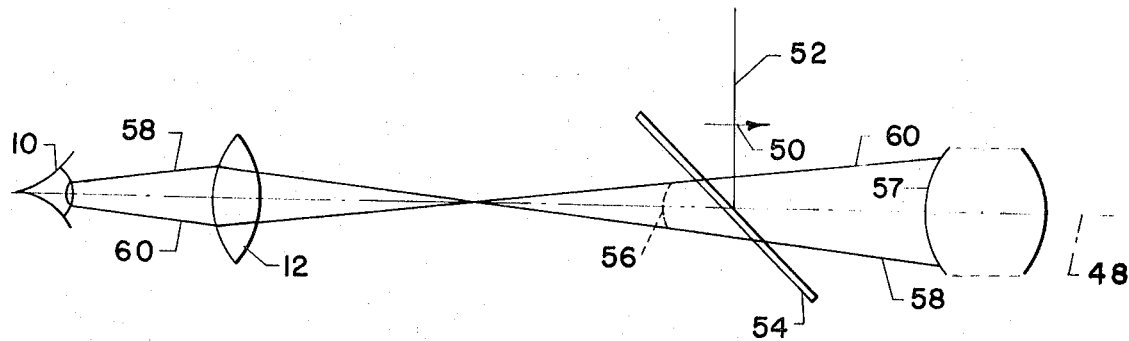
FIG. 3 is a schematic representation of another embodiment of the invention in which the marker is located off the optical axis.

In the schematic illustration of FIG. 1, a subject's eye 10 is positioned with respect to a relay lens 12 by means of a frame or rod 14 having a forehead rest 16. The lens is fixedly attached in a mount 18 which is slidable along the rod 14. The lens 12 may, therefore, be positioned at a predetermined distance from the subject's eye 10, and may then be secured in position by means of a thumbscrew 20 in the slidable mount 18. A marker needle 22 is also slidably mounted on the rod 14, on the opposite side of the lens from the subject's eye 10, and it is also temporarily secured in position by a thumbscrew 24. An ophthalmoscope, of the indirect stereoscopic type, shown in general by the reference numeral 26, is then positioned to focus on the produced aerial image, shown generally by reference numeral 28. The marker needle 22 should have vertical as well as horizontal movement relative to the aerial image 28 so that it may be placed specifically within the general plane of the image which the operator views through the ophthalmoscope 26.

The operation of the unit is generally as follows:

The lens 12 is placed in front of the subject's eye 10, generally about 2 inches or 5 centimeters from the eye. This projects an inverted, real, aerial image 28 which is viewed through the standard stereoptic indirect ophthalmoscope 26. The operator choses a reference plane in the image, and focuses on that plane with the ophthalmoscope, for example, the base of the optic disc. At the same time the marker needle 22 is positioned in the same plane. The operator then refocuses onto a secondary plane of interest, which may be a specific area on the optic retinal surface, and again superimposes the marker needle 22 into the new plane. The distance that the needle is moved along the rod 14 is noted and this provides an accurate indication of the relative positions of the two planes which may be used to determine the amount of depression or protrusion. A scale may be placed on the frame 14 in the vicinity of the needle 22 to provide a simple yet accurate means of determining the amount of movement of the needle. This unit, obviously, may be used to measure the relative positions of any visible objects within the intraocular space. Then, by knowledge of the optical characteristics of the optical elements utilized, very precise absolute dimensions may be determined.

The device illustrated in FIG. 2 provides a simple hand-held device which may be used in conjunction with a standard head-mounted stereoscopic ophthalmoscope. This unit includes a frame or rod member 30 having mounted thereon a slide frame 32 which supports a depending lens holding ring 34 having a relay lens 36 mounted therein. A thumbscrew 38 provides means for securing the frame 32 in a predetermined position on the rod 30. This predetermined position is a function of the optical characteristics of the eye lens and the relay lens 36. A marker needle holding frame 40 is also slidably mounted on the rod 30. A thumbscrew 42 provides means for temporarily securing the frame 40 on the rod 30. A marker needle 44 is slidably mounted in the frame 40 and a thumbscrew 46 provides means for temporarily securing the needle after raising and lowering it in the frame. The thumbscrews may be a rack and pinion arrangement to facilitate the movement of the frame or they may be simply a friction wheel on the thumbscrew shaft which impinges upon the rod or the needle, as the case may be, and the rotation of the thumbscrew and friction wheel moves the frame with respect to the rod in one case and the needle with respect to the frame in the other case. Either type of arrangement permits a one-hand adjustment of the needle in relation to the image projected by the relay lens 36 from the subject's eye. The thumbscrew movement may be a micrometer mechanism for very accurate measurements. This device is used in a similar manner to that of FIG. 1; however, the lens is now hand-held about 2 inches from the subject's eye and the inverted aerial image produced by the lens is viewed through an indirect stereoptic ophthalmoscope. The distance of movement of the needle is again indicative of the depression or elevation of the secondary plane of the subject's eye in relation to a primary or reference plane.

In another modification, the marker needle may be positioned within a monocular indirect ophthalmoscope. The relay lens is employed to project the aerial image on which the user focuses.

Various types of lenses may be used for the relay lens to obtain special effects in the aerial image. The method and apparatus of the invention contemplate such lens variations, in conjunction with the marker which provides the accurate relative position measurement when the viewing instrument is focused on the several planes of the aerial image. In each case, the marker is placed in the reference plane of focus in the aerial image and its consequent movement from one focus plane to another focus plane may be accurately measured.

Referring now to FIG. 3, there is shown another embodiment of the invention. In this embodiment, the marker means 50 is not physically located on the optical axis 48 but on a transverse optical axis 52. This optical axis intersects the primary optical axis 48 at the surface of a beam divider 54. It should be noted that while a semireflecting mirror is shown, many other beam dividers will also perform satisfactorily.

Once again, the relay lens 12 forms an aerial image 56 of the retina of the eye 10. The marker means 50 is optically positioned in a plane which is conjugate to a plane in the image 56. Therefore, by providing movement for the marker means 50 both laterally of and along the transverse optical axis 52, the marker means 50 may be optically positioned at will in the aerial image 56. This embodiment has the advantage that when the marker is not in use, it is not physically positioned between the eye viewing instrument 57 and the patient's eye 10.

Rays 58 and 60 are shown to schematically illustrate the desired afocal relationship between the lens of the eye 10 and the relay lens 12. It is necessary that this be afocal in order for the distance measurements to be linear. This would generally be accomplished by having the eye 10 fixated at its far point or beyond.

Figure 4:
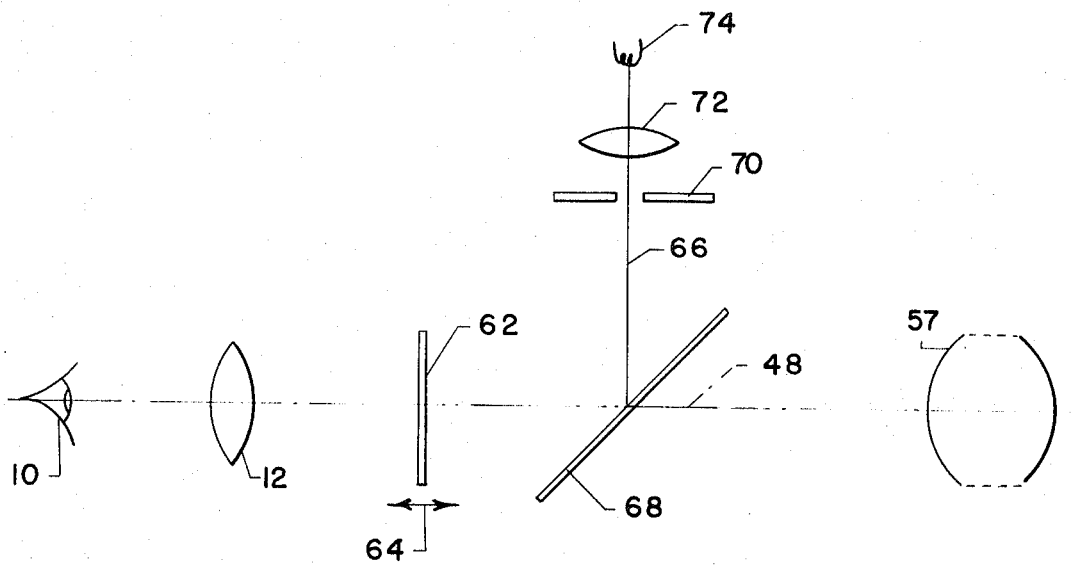
FIG. 4 is a schematic representation of still another embodiment of the invention in which the marker is replaced by a screen and means are shown for determining the relative size of the retinal irregularity.

FIG. 4 shows an additional embodiment of the invention in which the marker is replaced by a movable diffusing screen 62. The screen 62, which is generally of the ground or etched glass type, is located in the aerial image of the retina of the eye 10 which is formed by the relay lens 12. Only one plane of the retina is in focus on the screen 62 at a specific location; therefore, by moving the screen 62 along the optical axis 48 as shown by arrow 64, different planes of interest may be brought into focus on the screen. The operator observes the screen 62 with an eye viewing instrument 57. The movement of the screen 62 may then be measured or calibrated to determine the distance between the planes of interest.

Also included in this embodiment is a means for determining the relative size of an object on the retina of the eye 10. This is accomplished by measuring the diameter of the image of the object and comparing it to a dimension in the eye which is quite standard, such as the diameter of the optic disc. This is accomplished by projecting a disc or ring onto the screen 62 and adjusting the size of the disc or ring to coincide with the size of the image of the object or standard dimension. A variable iris diaphragm 70, for example, which is aligned on a transverse optical axis 66 with a light source 74 and a condenser lens 72, provides the variable diameter disc for use on the screen 62. A beam divider 68 directs the image of the disc onto the image on the screen 62. The diaphragm 70 must be movable along the transverse optical axis 66 and also normal thereto so that the variable diameter disc may be brought into sharp focus at any point within the aerial image.

A further modification may be made by forming a virtual image of the retina and then projecting an image of the marker onto the virtual image. Once again, the difference in position between various planes in the virtual image is measured by the movement of the marker when traversing the planes.

While there have been shown and described what are considered to be preferred embodiments of the present invention, it will be obvious to those skilled in the art that various changes and modifications may be made therein without departing from the spirit of the invention.

We claim:

1. Apparatus for measuring retinal depression and elevation for use in ophthalmoscopy with an eye viewing instrument, the apparatus comprising, a lens system optically aligned on an optical axis between a subject's eye and the eye viewing instrument to form an aerial image of the retina of the subject's eye, means including said viewing instrument for viewing the various planes of the aerial image formed by said lens system;

marker means optically positioned between the lens system and the eye viewing instrument, means for optically positioning said marker means throughout the various planes of the image; and means for measuring the relative movement of the marker means, said relative movement being an indication of the amount of retinal depression and elevation present.

2. Apparatus for measuring retinal depression and elevation for use in opthalmoscopy with an eye viewing instrument, the apparatus comprising,
- a relay lens system optically aligned on an optical axis between a subject's eye and the eye viewing instrument to form an aerial image of the retina of the subject's eye, means including said viewing instrument for viewing the various planes of the aerial image formed by said lens system;
- marker means optically positioned between the relay lens system and the eye viewing instrument; means for optically positioning said marker means throughout the various planes of the aerial image;
- means for supporting the marker means; and
- means for measuring the relative movement of the marker means, said relative movement being an indication of the amount of retinal depression and elevation present.

3. Apparatus according to claim 2 wherein the marker means is physically positioned between the relay lens system and the eye viewing instrument.

4. Apparatus according to claim 3 wherein the relay lens system and the marker means are mounted on the means for supporting and the means for measuring is formed on the means for supporting.

5. Apparatus according to claim 4 wherein the means for supporting extends to the head of the subject to provide means for positioning the relay lens system relative to the subject's eye.

6. Apparatus according to claim 2 wherein the marker means includes a sharp point for accurately establishing the relative position of a focus plane with the eye viewing instrument.

7. Apparatus according to claim 2 wherein the means for supporting is connected to the eye viewing instrument to provide positioning means therefor.

8. Apparatus according to claim 7 wherein the eye viewing instrument is movable relative to the marker means.

9. Apparatus according to claim 2 wherein the relay lens system includes a single relay lens.

10. Apparatus according to claim 2 wherein the marker means is physically located on a transverse optical axis, the transverse optical axis intersecting the optical axis of the relay lens system at a beam divider so that the marker means may be optically positioned in the aerial image.

11. Apparatus according to claim 10 wherein the beam divider is located between the aerial image and the eye viewing instrument.

12. Apparatus according to claim 2 wherein the marker means is an axially movable diffusing screen which is positioned in the aerial image and has a plane thereof in focus thereon.

13. Apparatus according to claim 2 which further includes means for determining the relative size of the retinal irregularity normal to the optical axis.

14. Apparatus according to claim 13 wherein the means for determining relative size includes a variable iris diaphragm and means for projecting an image thereof onto a plane in which the irregularity may be measured.

15. Apparatus according to claim 14 wherein the marker means is an axially movable diffusing screen which is positioned in the aerial image and has the plane in which the irregularity is to be measured in focus thereon.

16. Apparatus according to claim 2 wherein the relay lens system and the lens of the subject's eye form an afocal optical system in which linear depth measurements may be made.

17. A method of performing retinal depression and elevation measurements for use in ophthalmoscopy comprising,
- positioning a relay lens in front of a subject's eye forming an aerial image of the retina of the eye;
- focusing an eye viewing instrument on a reference plane in the aerial image;
- positioning a marker means in the reference plane in the aerial image;
- refocusing the eye viewing instrument on a secondary plane in the aerial image; and
- repositioning the marker means into the secondary plane in the aerial image to determine the relative positions of the planes in the aerial image.

18. A method according to claim 17 wherein the relay lens remains at a predetermined position in front of the subject's eye.

* * * * *